(12) United States Patent
Ooya et al.

(10) Patent No.: US 8,955,996 B2
(45) Date of Patent: Feb. 17, 2015

(54) LED LIGHT BULB

(71) Applicants: Yasumasa Ooya, Chigasaki (JP);
Masahiko Yamakawa, Yokohama (JP);
Yasuhiro Shirakawa, Yokohama (JP);
Katsutoshi Nakagawa, Yokohama (JP)

(72) Inventors: Yasumasa Ooya, Chigasaki (JP);
Masahiko Yamakawa, Yokohama (JP);
Yasuhiro Shirakawa, Yokohama (JP);
Katsutoshi Nakagawa, Yokohama (JP)

(73) Assignees: Kabushiki Kaisha Toshiba, Tokyo (JP);
Toshiba Materials Co., Ltd.,
Yokohama-shi (JP)

( * ) Notice: Subject to any disclaimer, the term of this patent is extended or adjusted under 35 U.S.C. 154(b) by 0 days.

(21) Appl. No.: 13/711,000

(22) Filed: Dec. 11, 2012

(65) Prior Publication Data
US 2013/0100645 A1 Apr. 25, 2013

Related U.S. Application Data

(63) Continuation of application No. PCT/JP2011/003614, filed on Jun. 24, 2011.

(30) Foreign Application Priority Data

Jun. 28, 2010 (JP) .................... 2010-146713
Aug. 30, 2010 (JP) .................... 2010-192533
Mar. 7, 2011 (JP) .................... 2011-048926

(51) Int. Cl.
*F21V 9/16* (2006.01)
*F21K 99/00* (2010.01)
(Continued)

(52) U.S. Cl.
CPC . *F21V 9/16* (2013.01); *F21K 9/135* (2013.01);
*F21K 9/56* (2013.01); *F21V 3/0409* (2013.01);
*F21Y 2101/02* (2013.01)
USPC ............. 362/84; 362/260; 313/498; 313/501;
313/502; 313/503; 313/512

(58) Field of Classification Search
CPC ....... H05B 33/12; F21Y 2101/02; F21K 9/00;
H01L 33/50
USPC ...................... 313/498, 501–603; 362/84, 260
See application file for complete search history.

(56) References Cited

U.S. PATENT DOCUMENTS 7,543,961 B2   6/2009 Arik et al.
7,659,549 B2 * 2/2010 Lin et al. .................... 257/98
(Continued)

FOREIGN PATENT DOCUMENTS

JP   2002-314136 A   10/2002
JP   2004-185997 A    7/2004
(Continued)

OTHER PUBLICATIONS

Database WPI Week 201040, Thomson Scientific, London, GB; AN 2010-G70279, XP002731137 & JP 2010-129300 A (Iimura H) Jun. 10, 2010.

*Primary Examiner* — Thomas A Hollweg
(74) *Attorney, Agent, or Firm* — Foley & Lardner LLP (57) ABSTRACT

In one embodiment, an LED light bulb includes an LED module, a base portion on which the LED module is disposed, and a globe attached to the base portion. The LED module includes an ultraviolet to violet light-emitting LED chip mounted on a substrate. A lighting circuit and a bayonet cap are provided in and on the base portion. A fluorescent film is provided on an inner surface of the globe, and emits white light by absorbing ultraviolet to violet light emitted from the LED chip. The fluorescent film has a film thickness in a range of 80 to 800 μm. In the LED light bulb, an amount of ultraviolet light which leaks from the globe is 0.1 mW/nm/lm or less.

13 Claims, 4 Drawing Sheets

(51) Int. Cl.
*F21V 3/04* (2006.01)
*F21Y 101/02* (2006.01)

(56) References Cited

U.S. PATENT DOCUMENTS

| | | | |
|---|---|---|---|
| 8,217,567 B2 * | 7/2012 | van de Ven et al. | 313/501 |
| 2006/0066210 A1 * | 3/2006 | Ng et al. | 313/486 |
| 2006/0099449 A1 * | 5/2006 | Amano et al. | 428/690 |
| 2007/0058357 A1 * | 3/2007 | Yamaguchi et al. | 362/84 |
| 2007/0267976 A1 * | 11/2007 | Bohler et al. | 315/112 |
| 2008/0093615 A1 * | 4/2008 | Lin et al. | 257/98 |
| 2008/0218992 A1 * | 9/2008 | Li | 362/84 |
| 2009/0002603 A1 | 1/2009 | Otsuka et al. | |
| 2009/0101930 A1 * | 4/2009 | Li | 257/98 |
| 2009/0251882 A1 * | 10/2009 | Ratcliffe | 362/84 |
| 2010/0123151 A1 | 5/2010 | Hata et al. | |
| 2010/0295464 A1 | 11/2010 | Kasakura et al. | |
| 2010/0314996 A1 * | 12/2010 | van de Ven et al. | 313/512 |
| 2011/0006334 A1 * | 1/2011 | Ishii et al. | 257/98 |

FOREIGN PATENT DOCUMENTS

| | | |
|---|---|---|
| JP | 2005-005546 A | 1/2005 |
| JP | 2006-036943 A | 2/2006 |
| JP | 2009-170114 A | 7/2009 |
| JP | 2009-238729 A | 10/2009 |
| JP | 2010-016223 A | 1/2010 |
| JP | 2010-123801 A | 6/2010 |
| JP | 2010-129300 A | 6/2010 |
| JP | 2010-129698 A | 6/2010 |
| TW | M383091 U | 6/2010 |
| WO | WO 2009/141982 A1 | 11/2009 |
| WO | WO 2009/145259 A1 | 12/2009 |

* cited by examiner

LED LIGHT BULB

CROSS-REFERENCE TO RELATED APPLICATIONS

This application is a continuation of prior International Application No. PCT/JP2011/003614 filed on Jun. 24, 2011, which is based upon and claims the benefit of priority from Japanese Patent Applications Nos. 2010-146713 filed on Jun. 28, 2010, 2010-192533 filed on Aug. 30, 2010 and 2011-048926 filed on Mar. 7, 2011; the entire contents of all of which are incorporated herein by reference.

FIELD

Embodiments described herein relate generally to an LED light bulb.

BACKGROUND

A light emitting device using a light-emitting diode (LED) is widely utilized for lighting devices such as a backlight of a liquid crystal display device, a signal device, various switches, a lamp for vehicle, and a general lighting. In particular, a white light-emitting LED lamp in which the LED and a phosphor are combined attracts attention as an alternative to an incandescent light bulb, and its development is advanced rapidly. As a light bulb having the LED lamp applied thereto (described as an LED light bulb, hereinafter), for example, there is known one having an integrated lamp structure in which to a base portion having a light bulb cap provided thereon, a globe is attached, LED chips are disposed in the globe, and a lighting circuit for the LED chips is provided in the base portion.

To a conventional LED light bulb, there is applied a combination of a blue light-emitting LED chip (a blue LED) and a yellow phosphor that absorbs blue light emitted from the blue LED to emit yellow light (a YAG phosphor or the like), and by a mixed color of the blue light from the blue LED and the yellow light from the yellow phosphor, white light is obtained. The LED light bulb having the blue LED and the yellow phosphor combined therein has a characteristic such that brightness is likely to be secured. The white light based on the mixed color of the blue light from the blue LED and the yellow light from the yellow phosphor deteriorates in color rendering property evaluated in an average color rendering index (Ra) and the like.

The conventional LED light bulb having the blue LED and the yellow phosphor combined therein has a light distribution biased toward a blue component and a yellow component, and a red component is insufficient. For this reason, reflected light when an object is seen under the light from the LED light bulb differs from a natural color when it is seen under sunlight. Further, in the conventional LED light bulb, the light radiated from the blue LED is used for the generation of white light, so that it is difficult to uniformize the luminance of the entire light bulb. This makes it difficult to decrease dazzle and local over-brightness of the light bulb, namely what is called glare.

DETAILED DESCRIPTION

An LED light bulb in an embodiment includes an LED module, a base portion on which the LED module is disposed, and a globe attached to the base portion to cover the LED module. The LED module includes an ultraviolet to violet light-emitting LED chip mounted on a substrate. A lighting circuit for lighting the LED chip and a bayonet cap electrically connected to the lighting circuit are provided in and on the base portion. On an inner surface of the globe, a fluorescent film is provided separately from the LED chip. The fluorescent film emits white light by absorbing ultraviolet to violet light emitted from the LED chip, and has a film thickness in a range of not less than 80 μm nor more than 800 μm. In the LED light bulb in the embodiment, an amount of ultraviolet light which leaks from the globe is 0.1 mW/nm/lm or less.

Figure 1:
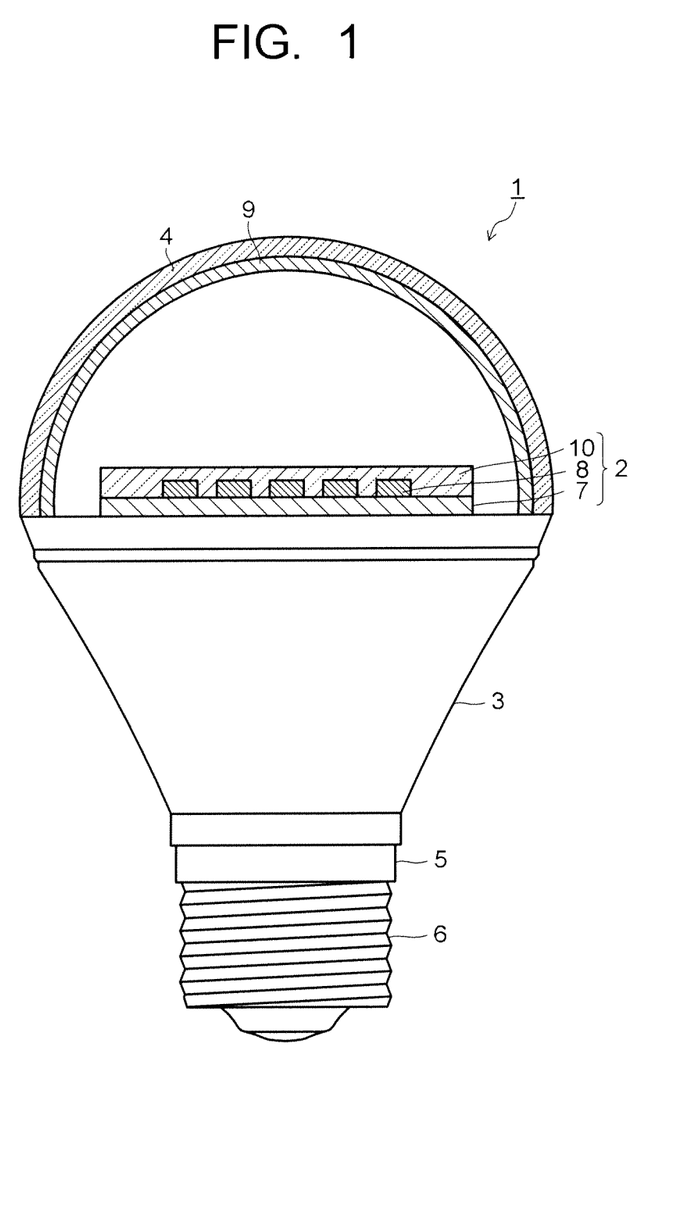
FIG. 1 is a view showing an LED light bulb according to a first embodiment in a partial cross section.
Figure 2:
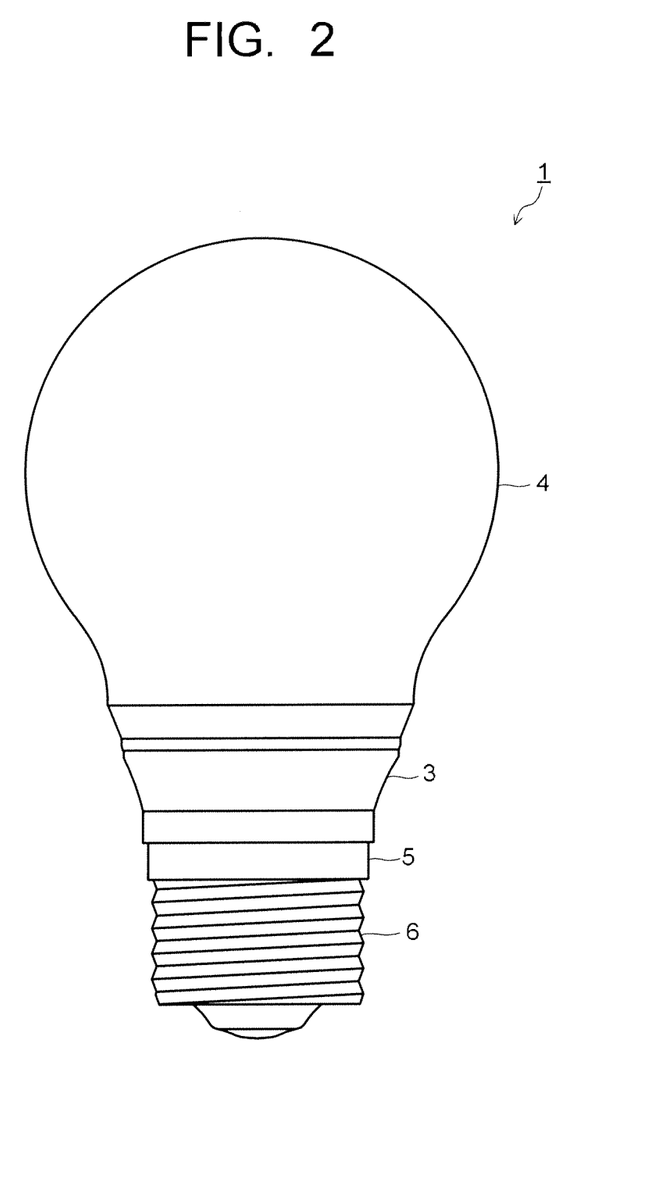
FIG. 2 is a view showing an LED light bulb according to a second embodiment.

Hereinafter, LED light bulbs in embodiments will be explained with reference to the drawings. FIG. 1 is a view showing a constitution of an LED light bulb according to a first embodiment in a partial cross section. FIG. 2 is a view showing an LED light bulb according to a second embodiment. LED light bulbs 1 shown in these drawings each include an LED module 2, a base portion 3 on which the LED module 2 is disposed, a globe 4 attached on the base portion 3 so as to cover the LED module 2, a bayonet cap 6 attached to a lower end portion of the base portion 3 via an insulating member 5, and a lighting circuit (not illustrated) provided in the base portion 3.

The LED module 2 is provided with ultraviolet to violet light-emitting LED chips 8 mounted on a substrate 7. On the substrate 7, a plurality of the LED chips 8 is surface-mounted. For the ultraviolet to violet light-emitting LED chips 8, a light-emitting diode based on InGaN, GaN, AlGaN, or the like is used. On a surface (and further in an inside, according to need) of the substrate 7, a wiring network (not illustrated) is provided, and electrodes of the LED chips 8 are electrically connected to the wiring network of the substrate 7. A wiring whose illustration is omitted is led out on a side surface or a bottom surface of the LED module 2 and is electrically connected to the lighting circuit (not illustrated) provided in the base portion 3. The LED chips 8 are lit by a direct-current voltage applied via the lighting circuit.

On an inner surface of the globe 4, there is provided a fluorescent film 9 which emits white light by absorbing ultraviolet to violet light emitted from the LED chips 8. Unlike a conventional LED module having phosphor particles dispersed in a sealing resin of LED chips, the fluorescent film 9 is provided on the inner surface of the globe 4 so as to separate from the LED chips 8. Electric energy applied to the LED light bulb 1 is converted into ultraviolet to violet light in the LED chips 8, and further the ultraviolet to violet light is converted into longer-wavelength light in the fluorescent film 9 and the light is emitted as white light. The white light emitted from the LED light bulb 1 is constituted only by the light emission of the fluorescent film 9, unlike a conventional LED light bulb having a blue LED and a yellow phosphor combined therein.

In the LED light bulb 1, the fluorescent film 9 provided on the whole inner surface of the globe 4 emits light, and thereby, unlike the conventional LED module having the phosphor particles dispersed in the sealing resin, it is possible to make the whole fluorescent film 9 surface-emit light, and white light spreads in all directions from the fluorescent film 9. Further, unlike the conventional LED light bulb having the blue LED and the yellow phosphor combined therein, the white light is obtained only by the light emission from the fluorescent film 9, thus making it possible to suppress local luminance unevenness and the like. Thereby, it is possible to obtain even and soft white light having no dazzle. That is, it becomes possible to drastically decrease glare of the LED light bulb 1 as compared with the conventional LED light bulb having the blue LED and the yellow phosphor combined therein.

The shape of the globe 4 is not limited in particular, and a dome shape as shown in FIG. 1 and an eggplant shape as shown in FIG. 2 can be applied. Incidentally, in FIG. 2, although the illustration of the constitution inside the globe 4 is omitted, the LED light bulb 1 shown in FIG. 2 is provided with a constitution similar to that of the LED light bulb 1 shown in FIG. 1 except that the shape of the globe 4 is different. The globe 4 is made of a translucent member, for example, a globe 4 made of translucent glass, a globe 4 made of resin, or the like is used. The globe 4 has a size equal to that of an incandescent light bulb, for example.

An emission color of the LED light bulb 1 is determined by the combination of an emission wavelength of the LED chip 8 and phosphors constituting the fluorescent film 9. In order to obtain white light in a manner to combine with the ultraviolet to violet light-emitting LED chips 8, the fluorescent film 9 is preferably constituted by a mixed phosphor (BGR or BYR phosphor) containing a blue phosphor, a green to yellow phosphor, and a red phosphor. Further, the mixed phosphor may also contain at least one phosphor selected from a blue-green phosphor and a deep red phosphor. The respective phosphors constituting the mixed phosphor are not limited in particular, but from the viewpoint of the combination with ultraviolet to violet light from the LED chips 8 and a color temperature and color rendering property (average color rendering index Ra and the like) of obtainable white light, phosphors described below are preferably used.

As the blue phosphor, a phosphor having an emission peak wavelength in a range of 430 to 460 nm is used. For example, there is preferably used a europium (Eu)-activated alkaline earth chlorophosphate phosphor having a composition represented by a general formula (1).

General formula: $(Sr_{1-x-y-z}Ba_xCa_yEu_z)_5(PO_4)_3Cl$ (1)

where, x, y, and z are numbers satisfying $0 \leq x < 0.5$, $0 \leq y < 0.1$, and $0.005 \leq z < 0.1$.

As the green to yellow phosphor, a phosphor having an emission peak wavelength in a range of 490 to 580 nm is used. For example, there is preferably used at least one selected from a europium (Eu) and manganese (Mn)-activated alkaline earth aluminate phosphor having a composition represented by a general formula (2), a europium (Eu) and manganese (Mn)-activated alkaline earth silicate phosphor having a composition represented by a general formula (3), a europium (Eu)-activated sialon phosphor having a composition represented by a general formula (4), and a europium (Eu)-activated sialon phosphor having a composition represented by a general formula (5).

General formula: $(Ba_{1-x-y-z}Sr_xCa_yEu_z)(Mg_{1-u}Mn_u)Al_{10}O_{17}$ (2)

where, x, y, z, and u are numbers satisfying $0 \leq x < 0.2$, $0 \leq y < 0.1$, $0.005 < z < 0.5$, and $0.1 < u < 0.5$.

General formula: $(Sr_{1-x-y-z-u}Ba_xMg_yEu_zMn_u)_2SiO_4$ (3)

where, x, y, z, and u are numbers satisfying $0.1 \leq x \leq 0.35$, $0.025 \leq y \leq 0.105$, $0.025 \leq z \leq 0.25$, and $0.0005 \leq u \leq 0.02$.

General formula: $(Si,Al)_6(O,N)_8:Eu_x$ (4)

where, x is a number satisfying $0 < x < 0.3$.

General formula: $(Sr_{1-x}Eu_x)_\alpha Si_\beta Al_\gamma O_\delta N_\omega$ (5)

where, x, α, β, γ, δ, and ω are numbers satisfying $0 < x < 1$, $0 < \alpha \leq 3$, $12 \leq \beta \leq 14$, $2 \leq \gamma \leq 3.5$, $1 \leq \delta \leq 3$, and $20 \leq \omega \leq 22$.

As the red phosphor, a phosphor having an emission peak wavelength in a range of 580 to 630 nm is used. For example, there is preferably used at least one selected from a europium (Eu)-activated lanthanum oxysulfide phosphor having a composition represented by a general formula (6), a europium (Eu)-activated CASN phosphor having a composition represented by a general formula (7), and a europium (Eu)-activated sialon phosphor having a composition represented by a general formula (8).

General formula: $(La_{1-x-y}Eu_xM_y)_2O_2S$ (6)

where, M is at least one element selected from Sm, Ga, Sb, and Sn, and x and y are numbers satisfying $0.08 \leq x \leq 0.16$ and $0.000001 \leq y < 0.003$.

General formula: $(Ca_{1-x-y}Sr_xEu_y)SiAlN_3$ (7)

where, x and y are numbers satisfying $0 \leq x < 0.4$ and $0 < y < 0.5$.

General formula: $(Sr_{1-x}Eu_x)_\alpha Si_\beta Al_\gamma O_\delta N_\omega$ (8)

where, x, α, β, γ, δ, and ω are numbers satisfying $0 < x < 1$, $0 < \alpha \leq 3$, $5 \leq \beta \leq 9$, $1 \leq \gamma \leq 5$, $0.5 \leq \delta \leq 2$, and $5 \leq \omega \leq 15$.

As the blue-green phosphor, a phosphor having an emission peak wavelength in a range of 460 to 490 nm is used. For example, there is preferably used a europium (Eu) and manganese (Mn)-activated alkaline earth silicate phosphor having a composition represented by a general formula (9).

General formula: $(Ba_{1-x-y-z-u}Sr_xMg_yEu_zMn_u)_2SiO_4$ (9)

where, x, y, z, and u are numbers satisfying $0.1 \leq x \leq 0.35$, $0.025 \leq y \leq 0.105$, $0.025 \leq z \leq 0.25$, and $0.0005 \leq u \leq 0.02$.

As the deep red phosphor, a phosphor having an emission peak wavelength in a range of 630 to 780 nm is used. For example, there is preferably used a manganese (Mn)-activated magnesium fluorogermanate phosphor having a composition represented by a general formula (10).

General formula: $\alpha MgO \cdot \beta MgF_2 \cdot (Ge_{1-x}Mn_x)O_2$ (10)

where, α, β, and x are numbers satisfying $3.0 \leq \alpha \leq 4.0$, $0.4 \leq \beta \leq 0.6$, and $0.001 \leq x \leq 0.5$.

The ratio of the phosphors constituting the mixed phosphor is appropriately set according to the emission color of the LED light bulb 1, and the like, but, for example, the mixed phosphor preferably contains, in a mass proportion, the blue phosphor in a range of 10 to 60%, the blue-green phosphor in a range of 0 to 10%, the green to yellow phosphor in a range of 1 to 30%, the red phosphor in a range of 30 to 90%, and the deep red phosphor in a range of 0 to 35%. According to such a mixed phosphor, it is possible to obtain white light having a correlated color temperature in a wide range of 6500 K to 2500 K with the same phosphor types. In the case of the conventional combination of the blue LED and the yellow phosphor, only the combination of two colors is not sufficient to thus make it difficult to adjust a light bulb color of 2800 K with a deviation, and consequently the red phosphor to emit light by blue excitation is required to be added.

The fluorescent film 9 is formed in a manner that, for example, a mixed phosphor powder is mixed with a binder made of an organic resin and the like and this mixture (for example, a slurry) is applied on the inner surface of the globe 4 and then is heated cured. The mixed phosphor powder preferably has a mean particle diameter (a median in a particle size distribution (D50)) in a range of 3 to 50 μm. By using the mixed phosphor having such a mean particle diameter (phosphor particles), it is possible to increase absorbency of ultraviolet to violet light radiated from the LED chips 8, and it becomes possible to improve the luminance of the LED light bulb 1.

In the case when as an excitation source of the LED light bulb 1, the ultraviolet to violet light-emitting LED chip 8 is used, unlike the conventional LED light bulb having the blue LED and the yellow phosphor combined therein, the fluorescent film 9 can be constituted by the various phosphors, as described above. That is, a selection range of phosphor types constituting the fluorescent film 9 is broadened, thus making it possible to increase the color rendering property and the like of white light emitted from the LED light bulb 1. Specifically, it is possible to obtain white light having a correlated color temperature of 6500 K or less and the average color rendering index (Ra) of 85 or more. Obtaining such white light makes it possible to improve the practicality and the like of the LED light bulb 1 as an alternative to an incandescent light bulb.

The LED chip 8 is only required to be an LED in an ultraviolet to violet light emission type (with an emission peak wavelength of 350 to 430 nm), but it is preferred to use an LED chip 8 having an emission peak wavelength in a range of 370 to 410 nm and a full width at half maximum of an emission spectrum in a range of 10 to 15 nm, in particular. In the case when such LED chips 8 and the fluorescent film 9 constituted by the above-described mixed phosphor (the BGR or BYR phosphor, or the mixed phosphor of the BGR or BYR phosphor and the blue-green phosphor and/or the deep red phosphor) are combined and used, it is possible to obtain white light stable in terms of the correlated color temperature (the emission color) regardless of output variations of the LED chips 8, and it becomes possible to increase a yield of the LED light bulb 1. In the conventional combination of the blue LED and the yellow phosphor, the output variations of LED chips directly affect the correlated color temperature (the emission color), and thus the yield of the LED light bulb is likely to decrease.

Further, the plural LED chips 8 surface-mounted on the substrate 7 are preferably covered with a transparent resin layer 10. That is, the LED module 2 is preferably provided with the plural LED chips 8 surface-mounted on the substrate 7 and the transparent resin layer 10 provided on the substrate 7 so as to cover the plural LED chips 8. For the transparent resin layer 10, for example, a silicone resin, an epoxy resin, or the like is used, and particularly, a silicone resin having excellent ultraviolet light resistance is preferably used. In this manner, by the plural LED chips 8 being covered with the transparent resin layer 10, lights emitted from the respective LED chips 8 propagate, and thereby local strength and weakness of light to cause glare are alleviated and efficiency of taking out light can be increased.

Incidentally, in the case when as an excitation source of the fluorescent film 9, the ultraviolet to violet light-emitting LED chip 8 is used, it becomes important to suppress leakage of ultraviolet light from the globe 4. There is a risk that the ultraviolet light leaked from the globe 4 adversely affects a printed matter, food, medicine, a human body, and so on existing in the vicinity of the LED light bulb 1 and in a room space where the LED light bulb 1 is disposed. From such a point, in the LED light bulb 1 in the embodiment, an amount of ultraviolet light that leaks from the globe 4 (an energy amount of ultraviolet light) is set to 0.1 mW/nm/lm or less. Such an ultraviolet light leakage amount is on a level equal to or less than that of a conventional lighting fixture such as a fluorescent light, and thus it is possible to suppress color deterioration of a printed matter, deterioration of food and medicine, and an adverse effect on a human body, and it becomes possible to improve the practicality of the LED light bulb 1.

For decreasing the ultraviolet light leakage amount from the globe 4, it is effective to increase the film thickness of the fluorescent film 9. In the LIED light bulb 1 in the embodiment, white light is obtained only by the light emission from the fluorescent film 9, thus making it possible to increase the film thickness of the fluorescent film 9, and also in such a case, chromaticity and the like of white light emitted from the LED light bulb 1 are not affected. However, if the film thickness of the fluorescent film 9 is increased too much, the brightness of the LED light bulb 1 decreases. Thus, the LED light bulb 1 in the embodiment is provided with the fluorescent film 9 having a film thickness of 80 to 800 μm. Applying the fluorescent film 9 having a film thickness of 80 to 800 μm makes it possible to suppress the decrease in brightness of the LED light bulb 1 while decreasing the amount of ultraviolet light that leaks from the globe 4 to 0.1 mW/nm/lm or less.

The ultraviolet light leakage amount indicates a value (unit: mW/nm/lm) obtained by dividing an ultraviolet to violet light emission peak value (unit: mW/nm) in a range of 370 to 415 nm in an emission spectrum measured by a later-described measurement system by a luminous flux (unit: lm) of the LED light bulb 1. Incidentally, the emission peak value in the above-described wavelength range indicates a spectrum height of a wavelength where the emission peak exists, and does not indicate an area of the emission spectrum. The ultraviolet to violet light emission peak in a range of 370 to 415 nm is the light emission from the LED chips 8 itself. In the case when the total amount of light radiated from the LED chips 8 is absorbed into the fluorescent film 9, the emission peak does not exist in the above-described wavelength range. However, the absorbency of the fluorescent film 9 is not 100%, so that the light emitted from the LED chips 8 remains partly.

In this embodiment, the film thickness of the fluorescent film 9 is increased, to thereby prevent the remaining light of the LED chips 8 from being emitted to the outside of the LED light bulb 1, but still part of the light leaks to the outside. The ultraviolet light leakage amount stipulated in this embodiment simply indicates at what proportion direct light from the LED chips 8 is contained with respect to the total amount of light emitted from the LED light bulb 1. The light leakage amount from the LED light bulb 1 is defined as the ultraviolet light leakage amount, but a light emission component other than the ultraviolet light is also contained actually. For example, in the case when LED chips 8 having an emission peak wavelength of 405 nm are used, light in which violet light being 50% or more and ultraviolet light being less than 50% are mixed leaks from the globe 4. Here, the amount of the mixed light of violet light and ultraviolet light is defined to be the ultraviolet light leakage amount collectively.

Figure 3:
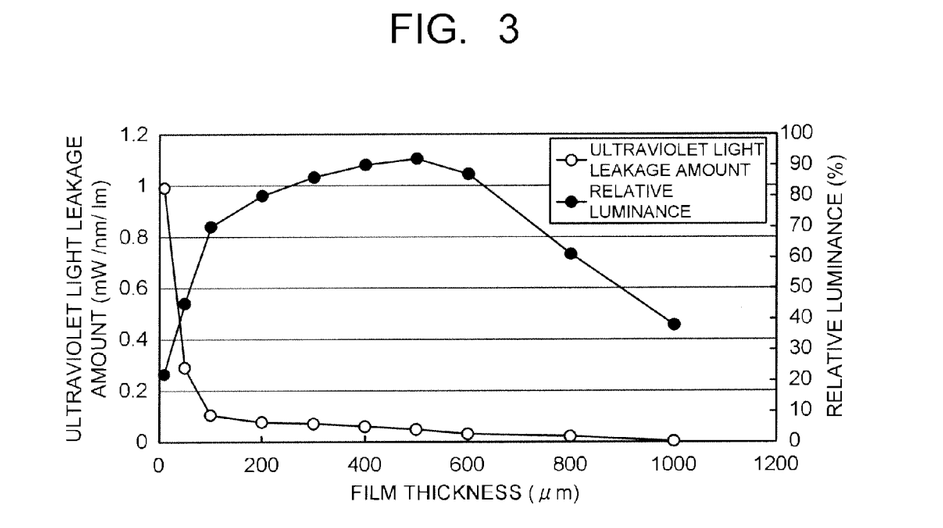
FIG. 3 is a view showing the relationship between a film thickness of a fluorescent film and an ultraviolet light leakage amount and relative luminance in the LED light bulb.

In FIG. 3, there is shown the relationship between the film thickness of the fluorescent film 9 and the ultraviolet light leakage amount from the globe 4 and the brightness (relative luminance) of the LED light bulb 1 at the time of lighting. Here, fluorescent films 9 having different film thicknesses were each formed on an inner surface of a dome-shaped globe 4 made of polycarbonate, and the relationship between the film thickness of the fluorescent film 9 and the ultraviolet light leakage amount was examined. The thickness of the globe 4 was about 1.5 mm and the light transmittance was 88%. As for the fluorescent film 9, as the blue phosphor, an Eu-activated chlorophosphate phosphor powder having a mean particle diameter of 28.0 μm, as a green phosphor, an Eu and Mn-activated silicate phosphor powder having a mean particle diameter of 30.5 μm, and as the red phosphor, an Eu-activated lanthanum oxysulfide phosphor powder having a mean particle diameter of 29.2 μM were used, and a mixture of these powders (the color temperature: 2700 K) was used, whereby the fluorescent film 9 was formed.

As shown in FIG. 3, the ultraviolet light leakage amount decreases as the film thickness of the fluorescent film 9 is increased, and in particular, the ultraviolet light leakage amount decreases rapidly until the film thickness of 100 μm, and thereafter it decreases gently. From this point, under the above-described condition, the film thickness of the fluorescent film 9 is desirably set to 100 μm or more in order to suppress the ultraviolet light leakage amount. At this time, the ultraviolet light leakage amount at the film thickness of 100 μm is 0.104 mW/nm/lm. In terms of only the suppression of the ultraviolet light leakage amount, the thicker the film thickness of the fluorescent film 9 is, the more desirable it is, but if the film thickness is increased too much, brightness of the fluorescent film 9 decreases. Under the above-described condition, at the film thickness of about 500 μm, the brightness of the fluorescent film 9 becomes maximum, and at the film thickness of about 700 μm, the relative luminance decreases to 70%. The brightness of the LED light bulb 1 at this time is 35 [lm/W], and if it further decreases, a problem is caused practically. For this reason, the film thickness of the fluorescent film 9 is preferably set to 700 μm or less.

The brightness and film density of the fluorescent film 9 change according to the particle diameter of the phosphor particle constituting the fluorescent film 9. The ultraviolet light leakage amount and the brightness of the fluorescent film 9 are affected by the particle diameter of the phosphor. Normally, as the particle diameter of the phosphor becomes smaller, an optimum film thickness becomes thinner. As for the above-described condition, the phosphor particles having a mean particle diameter of about 30 μm were used, but the mean particle diameter of the phosphor may be smaller, or may also be larger than it. As described above, in the LED light bulb 1 in this embodiment, the phosphor particles having a mean particle diameter in a range of 3 to 50 μm is preferably used.

When phosphors having a mean particle diameter of about 3 μm are used to form a fluorescent film 9 and the ultraviolet light leakage amount is measured, by setting the film thickness of the fluorescent film 9 to 80 μm or more, it is possible to set the ultraviolet light leakage amount to 0.1 mW/nm/lm or less. Further, in the case when phosphors having a mean particle diameter of 50 μm are used, the optimum film thickness shifts in the direction of the film thickness being thick rather than the data shown in FIG. 3, but when the film thickness exceeds 800 μm, the brightness of the LED light bulb 1 decreases lower than 35 [lm/W]. In the case of the phosphors having a mean particle diameter of 3 μm being used, in terms of only the brightness, the practical brightness was obtained in spite of the film thickness being 80 μm or less, but when the film thickness of the fluorescent film 9 was decreased to a fixed value or less, the ultraviolet light leakage amount increased, so that as for the film thickness, 80 μm was a limit.

The fluorescent film 9 and the film thickness thereof are defined as below. The fluorescent film 9 is a coating film member containing phosphor powders, and is one in which with an organic resin and the like as a binder, phosphor particles form continuous coating films normally. As long as the organic resin used as a binder has a light transmitting property and binding ability, it is not limited in particular. The binder that binds phosphor particles together to form a coating film is not limited to the organic resin, and as long as an inorganic material (an inorganic binder) has a similar function, it can also be used.

The fluorescent film 9 may be a single layer film, or may also be a multilayer film. In the case of the fluorescent film 9 being a single layer film, the film thickness of the fluorescent film 9 means the film thickness of its own. In the case of the fluorescent film 9 being a multilayer film, the individual film thickness of each of single layer films is ignored, the whole multilayer film is regarded as a single film, and the thickness from an uppermost end to a lowermost end of the overlapping plural single layer films is set to the film thickness of the fluorescent film 9. In this case, even though the fluorescent film 9 is a multilayer film made of the same type of phosphor, or a multilayer film made of different types of phosphors, the definition of the film thickness is the same. Further, even in the case when a gap partly exists between the adjacent single layer films and an inclusion partly exists in the single layer film or between the single layer films, they are ignored and the above single layer films are each regarded as a single film, and the overall thickness is measured to be set to the film thickness of the fluorescent film 9.

The overall definition of the film thickness of the fluorescent film 9 is as described above, but a detailed stipulation is as described below. It is matter of course that the phosphor particles are contained in the fluorescent film 9, but their distribution states are different. Particularly, in the fluorescent film 9 using an organic resin as a binder, there is sometimes a case that the phosphor particles and the resin are separated in the fluorescent film 9 and the phosphor particles are segregated. For example, in the case of a silicone resin being used as the organic resin, a mixture of the phosphor powders and the resin is applied and then is heated and dried, and thereby the resin is cured to form (solidify) the fluorescent film 9. On this occasion, there is sometimes a case that the phosphor particles are sedimented in a resin solution until the resin is cured completely and the fluorescent film 9 is separated into a lower layer with the dense phosphor particles and an upper layer with the sparse phosphor particles. In such a case, the portion with the phosphors existing therein practically, or the portion having a function similar to that of the phosphors is only regarded as the fluorescent film 9. However, such a case is separately defined in the following two states specifically.

The first case is when as the binder, a resin that hardly absorbs near-ultraviolet light are used. In this case, even though the fluorescent film 9 is a single layer, the portion with the phosphor particles existing therein practically is set as the fluorescent film and the portion with no phosphor particles existing therein practically is simply regarded a resin layer, and the resin layer is excluded from the film thickness of the fluorescent film 9. As the organic binder, a resin material that absorbs no ultraviolet light is used generally. This is because if the resin material absorbs ultraviolet light, an amount of ultraviolet light for making the phosphors emit light is decreased and the brightness is likely to decrease. Further, the resin material is deteriorated by ultraviolet light, and film peeling and the like are likely to occur. The layer containing no phosphor particles and made of only the resin does not emit light and further does not absorb ultraviolet light, so that it is not regarded as the fluorescent film 9.

The second case is when as the binder, a resin that absorbs a fixed amount or more of near-ultraviolet light are used. As described in the first case, as the binder, a material that absorbs ultraviolet light is not selected generally. However, the above is not applied in the case when ultraviolet light absorbing ability is used actively. As an extreme example, the case where an ultraviolet light absorbing layer made of 100% resin material (binder) is formed immediately on the fluorescent film 9 is supposed. In this embodiment, the mean particle diameter of the phosphor preferably falls within a range of 3 to 50 μM. The brightness of the fluorescent film 9 relays on the particle diameter of the phosphor constituting the fluorescent film 9, and as the particle diameter of the phosphor is smaller, the film thickness at which the luminance becomes maximum tends to be thin. The film thickness of the fluorescent film 9 is required to be at least 80 μm or more in order to suppress the ultraviolet light leakage amount. For this reason, the mean particle diameter of the phosphor is preferably 3 μm or more.

However, in the case when phosphors having a mean particle diameter of 2.5 μm, for example, are used, if a fluorescent film has a film thickness of about 65 μm, the substantially equal luminance can be obtained. However, the film thickness of the fluorescent film becomes thinner than 80 μm, so that the ultraviolet light leakage amount exceeds 0.1 mW/nm/lm. In such a case, when an ultraviolet light absorbing layer made of a transparent resin is formed on the fluorescent film 9 to have a film thickness of, for example, 30 μm, the luminance of the fluorescent film is substantially equal, and simultaneously, the ultraviolet light leakage amount is decreased. In such a case, although no phosphor particles are contained in the ultraviolet light absorbing layer, in terms of the ultraviolet light absorbing ability, the same effect as the phosphor particles exist can be obtained, and thus the ultraviolet light absorbing layer is also regarded as a part of the fluorescent film 9 practically to be added to the film thickness of the fluorescent film 9. In this case, the film thickness of the fluorescent film 9 is not 65 μm, but becomes 95 μm obtained by adding the thickness of the ultraviolet light absorbing layer (30 μm) to 65 μm.

The effect by the ultraviolet light absorbing layer is the same not only in the vicinity of the lower limit value of the film thickness of the fluorescent film 9 but also in the vicinity of the upper limit value thereof. For example, if a fluorescent film having a film thickness of 800 μm is formed and further thereon, the ultraviolet light absorbing layer being 50 μm is formed, a fluorescent film, of which the luminance is substantially equal and the ultraviolet light leakage amount is more improved, can be obtained with respect to a single film having a film thickness of 800 μm and made of the phosphors. In this case, in the single film having a film thickness of 800 μm and made of the phosphors, the ultraviolet light leakage amount already becomes a specified value or less, so that even if on this fluorescent film, the ultraviolet light absorbing layer having a film thickness of 10 μm is formed, or the ultraviolet light absorbing layer having a film thickness of 100 μm is formed, the ultraviolet light leakage amount becomes a specified value or less. When in the vicinity of the upper limit value of the film thickness of the fluorescent film 9, the film thickness of the ultraviolet light absorbing layer is added to the film thickness of the fluorescent film, the upper limit value becomes a dubious value. Thus, in such a case, the thickness of the portion with the phosphor particles existing therein practically is taken as the film thickness of the fluorescent film 9 as a matter of convenience.

Incidentally, in the above-described definition of the fluorescent film 9, the organic binder (resin material) that absorbs no ultraviolet light indicates a material having an absorbed amount of ultraviolet light substantially equal to or less than that of 390 nm of a silicone resin EG-6301 (product name) manufactured by Dow Corning Corporation. The organic binder that absorbs ultraviolet light indicates a material having an absorbed amount of ultraviolet light substantially equal to or more than that of 400 nm of an epoxy resin NLD-SL-2101 (product name) manufactured by SANYU REC Co., Ltd. As for a specific value of the absorbed amount of ultraviolet light, the value in the former material corresponds to 10% or less and the value in the latter material corresponds to 55% or more. It is hardly supposed that a material having an absorbed amount of ultraviolet light indicating an intermediate value between the above-described two resins is used, but if the material is used hypothetically, according to an intermediate value between both the absorbed amounts of ultraviolet light set as the boundary, a material having an absorbed amount close to that of an epoxy resin NLD-SL-2101 (product name) manufactured by SANYU REC Co., Ltd. is recognized as the binder that absorbs ultraviolet light, and a material having an absorbed amount close to that of a silicone resin EG-6301 (product name) manufactured by Dow Corning Corporation is recognized as the binder that absorbs no ultraviolet light.

Figure 4:
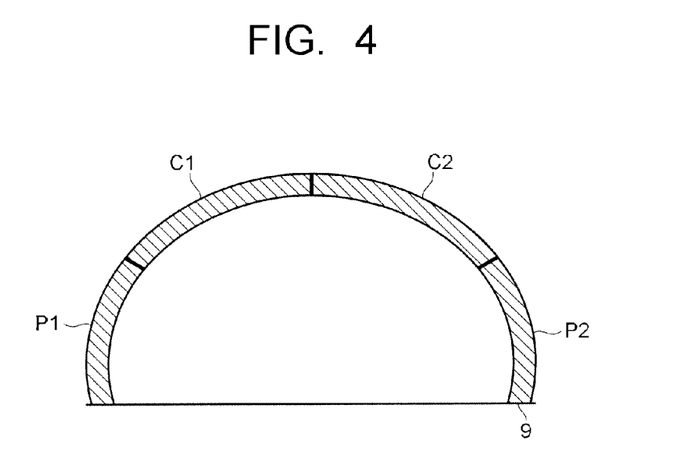
FIG. 4 is a view explaining a measuring method of the film thickness of the fluorescent film.

The film thickness of the fluorescent film 9 indicates a value measured in the following manner. Hereinafter, as a representative example, a measuring method of a dome-shaped fluorescent film 9 will be explained. A similar method is employed also for a fluorescent film 9 having a different shape. A sample for measurement is made in the following procedure. First, the fluorescent film 9 is divided into two substantially equal portions on an arbitrary surface passing through a vertex of the dome-shaped fluorescent film 9. Then, a cross section shown in FIG. 4 is obtained. This cross section is further divided into four substantially equal portions, which are a first peripheral portion P1, a first center portion C1, a second center portion C2, and a second peripheral portion P2. An arbitrary single place is selected from each of the portions to be observed microscopically and four cross-sectional photographs at a magnification of 100 times are taken in total.

Figure 5:
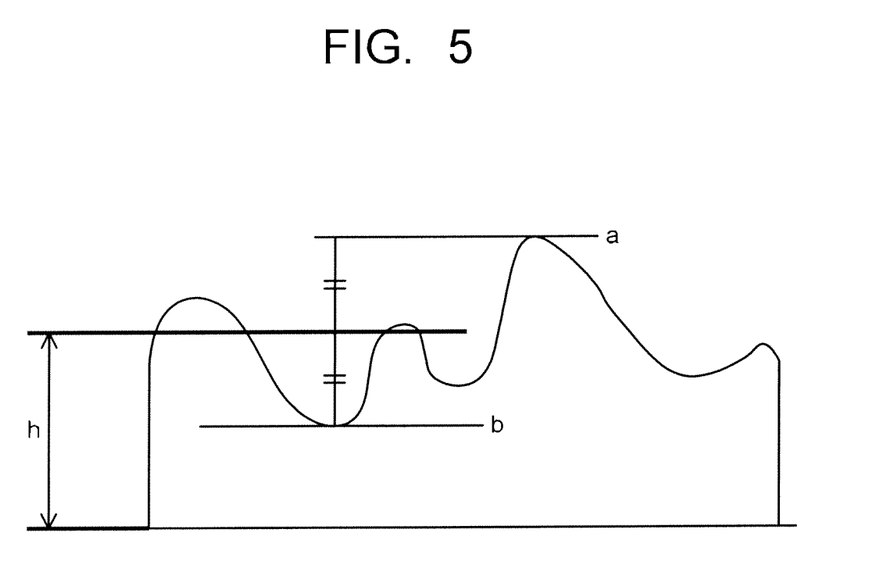
FIG. 5 is a view explaining a method of defining the film thickness in the case when the fluorescent film has asperities.

Next, by utilizing each of the obtained photographs, the film thickness is measured. A measuring method of the film thickness is as shown in FIG. 5. In the case when there are asperities on the surface of the fluorescent film 9 to be measured, as shown in FIG. 5, a topmost portion a and a bottommost portion b of the obtained cross-sectional photograph are obtained and a mean value of the topmost portion a and the bottommost portion b is set to a surface height. By such a method, the film thickness of the fluorescent film 9 is measured and four pieces of film thickness data in total are obtained. From four pieces of the data, a maximum value and a minimum value are excluded and a mean value of two intermediate values is obtained to be set to the film thickness of the fluorescent film 9.

The fluorescent film 9 to be measured described here follows the above-described definition of the fluorescent film 9. In the above-described definition, the portion with the phosphor particles existing therein practically is handled specifically as described below by a photograph judging method. That is, in the cross-sectional photograph of the portion in which the phosphor particles and the binder material are mixed, a portion having an area ratio occupied by the phosphor particles of 40% or more is set to the portion with the phosphor particles existing therein practically.

As the material of the globe 4 on which the fluorescent film 9 is formed, as described previously, an organic resin such as polycarbonate, an acrylic resin, or a cyclic olefin copolymer (COC), glass, and so on can be cited. Here, properties required for the material forming the globe 4 arc such that the material has visible light transmit therethrough, the fluorescent film 9 is applicable on the inner surface, the material is not thermally deformed due to the elevated temperature at the time of lighting continuously, and the like, and so on. In particular, the transmittance of visible light is important and the globe 4 is preferably made of a translucent member having a light transmittance of 80% or more. In the case when the light transmittance of the globe 4 is less than 80%, if the film thickness of the fluorescent film 9 is in the vicinity of the lower limit value or in the vicinity of the upper limit value of the film thickness range, there is a risk that the practical brightness cannot be obtained. Here, the light transmittance indicates a value measured by using a test piece having a thickness of 3 mm according to the method stipulated in ASTM D 1003.

Further, for the material forming the globe 4, various materials can be selected also from the viewpoint of decreasing the ultraviolet light leakage amount. For decreasing the ultraviolet light leakage amount, the globe 4 is preferably formed of a material through which visible light transmits as much as possible and ultraviolet light hardly transmits. It is also possible to increase the thickness of the globe 4 to thereby decrease the ultraviolet light leakage amount with the same material. Further, it is also effective to mix an ultraviolet light absorbing material in the material forming the globe 4 or to apply an ultraviolet light absorbing film on the inner and outer surfaces of the globe 4, and thereby a similar effect can be obtained.

As the ultraviolet light absorbing material to be mixed in the material forming the globe 4, for example, zinc oxide can be cited. When zinc oxide is mixed in the material forming the globe 4, the ultraviolet light leakage amount is further decreased, but part of visible light is also absorbed and the brightness of the LED light bulb 1 also decreases thereby, and thus it is preferred that the ultraviolet light absorbing material should be used properly depending on the intended use. Incidentally, in the LED light bulb 1 in this embodiment, the ultraviolet light leakage amount is decreased based on the film thickness of the fluorescent film 9, so that in terms of preventing the leakage of ultraviolet light, the forming material, shape, and so on of the globe 4 are not limited.

In this embodiment, as a preferred embodiment, the film thickness of the fluorescent film 9 is set from both aspects of the ultraviolet light leakage amount and the brightness, and there can be cited an LED light bulb 1 in which transparent glass is used as the material forming the globe 4. In the case of a glass material, there is also a type letting most ultraviolet light transmit therethrough, but in this embodiment, the fluorescent film 9 blocks ultraviolet light, so that even though the globe 4 is formed of a glass material, it is possible to decrease the ultraviolet light leakage amount. On that basis, the globe 4 is formed of a glass material having a high transmittance of visible light, thereby making it possible to increase the brightness of the LED light bulb 1.

The resin material as the material forming the globe 4 has a larger absorbed amount of ultraviolet light than a glass material in general, and particularly, polycarbonate has excellent absorbing ability. If polycarbonate having a high light transmittance is used as the material forming the globe 4, good properties can be obtained in terms of the brightness and the ultraviolet light leakage amount. Further, the resin material is not broken as is a glass material and thus is also excellent in safety. From such a point, as a particularly preferred embodiment, there can be cited an LED light bulb 1 having a globe 4 made of polycarbonate.

As described above, according to the LED light bulb 1 in this embodiment, the film thickness of the fluorescent film 9 is set to fall within a range of not less than 80 μm nor more than 800 μm, and thereby it is possible to decrease the ultraviolet light leakage amount to 0.1 mW/nm/lm or less while securing the practical brightness. Thus, it becomes possible to suppress the deterioration of peripheral parts caused by ultraviolet light, and the like. The film thickness of the fluorescent film 9 is more preferably set to fall within a range of not less than 150 μm nor more than 600 μm from the viewpoint of the brightness of the LED light bulb 1. This film thickness range is a range where the brightness is more improved by 5% or more than a practical lower limit value and the brighter fluorescent film 9 can be obtained. For this reason, a selection range of combinations of the phosphors usable in the fluorescent film 9 of the LED light bulb 1 is broadened, thereby making it possible to fabricate the LED light bulb 1 having various color rendering properties.

The LED light bulb 1 in this embodiment is fabricated in the following manner, for example. First, a phosphor slurry containing phosphor powders is prepared. The phosphor slurry is prepared by mixing the phosphor powders with a binder resin such as a silicone resin, an epoxy resin, or a urethane resin and a filler such as alumina or silica, for example. A mixing ratio of the phosphor and the binder resin is appropriately selected according to the type or particle diameter of the phosphor, but when the phosphor is set to 100 parts by mass, for example, the binder resin is preferably set to fall within a range of 20 to 1000 parts by mass. The type, mean particle diameter, mixing ratio, and so on of the phosphor are preferably set appropriately from the above-described condition ranges according to the targeted white light.

Next, the phosphor slurry is applied on the inner surface of the globe 4. The application of the phosphor slurry is performed by, for example, a spray method, a dip method, a method of rotating the globe 4, or the like, and the phosphor slurry is evenly applied on the inner surface of the globe 4. Next, an applied film of the phosphor slurry is heated and dried by using a heating device such as a dryer or an oven, and thereby the fluorescent film 9 is formed on the inner surface of the globe 4. On this occasion, the film thickness of the fluorescent film 9 is adjusted so as to fall with in a range of 80 to 800 μm. The film thickness of the fluorescent film 9 is adjusted by a solid component amount in the phosphor slurry, a binder viscosity, curing temperature and time, and so on. Thereafter, the globe 4 having the fluorescent time 9 is attached to the base portion 3 having the LED module 2, the bayonet cap 6, and so on disposed thereon, whereby the targeted LED light bulb 1 is fabricated.

Next, there will be described specific examples and evaluation results thereof.

Examples 1 to 10

First, there were prepared, as the blue (B) phosphor, an Eu-activated alkaline earth chlorophosphate $((Sr_{0.604}Ba_{0.394}Eu_{0.002})_5(PO_4)_3Cl)$ phosphor having a mean particle diameter of 40 μm, as the blue-green (BG) phosphor, an Eu and Mn-activated alkaline earth silicate $((Sr_{0.225}Ba_{0.65}Mg_{0.0235}Eu_{0.1}Mn_{0.0015})_2SiO_4)$ phosphor having a mean particle diameter of 20 μm, as the green to yellow (GY) phosphor, an Eu and Mn-activated alkaline earth silicate $((Sr_{0.675}Ba_{0.25}Mg_{0.0235}Eu_{0.0}Mn_{0.0015})_2SiO_4)$ phosphor having a mean particle diameter of 17 μm (1) and an Eu and Mn-activated aluminate silicate (($Ba_{0.9}Mg_{0.5}Eu_{0.2}Mn_{0.4}$)$Al_{10}O_{17}$) phosphor having a mean particle diameter of 38 μm (2), as the red (R) phosphor, an Eu-activated lanthanum oxysulfide (($La_{0.9}Eu_{0.1}$)$_2O_2S$) phosphor having a mean particle diameter of 45 μm (1) and an Eu-activated sialon (($Sr_{0.9}Eu_{0.1}$)$_2Si_7Al_3ON_{13}$) phosphor having a mean particle diameter of 11 μm (2), and as the deep red (DR) phosphor, a Mn-activated magnesium fluorogermanate ($3.5MgO \cdot 0.5MgF_2 \cdot (Ge_{0.75}Mn_{0.25})O_2$) phosphor having a mean particle diameter of 12 μm.

Each of the above-described phosphors was mixed at a ratio shown in Table 1 and by using these mixed phosphors, LED light bulbs were each fabricated in the following manner. First, the phosphors are dispersed in a silicone resin as a binder resin to be subjected to deaeration. Next, a phosphor slurry is applied to the inside of a globe in an amount to have a desired film thickness and the globe is rotated by changing an angle so that the phosphor slurry may spread out on the inner surface of the globe evenly. Next, by using an infrared heater, a dryer, or the like, heating is performed until the phosphor slurry starts to cure and an applied film stops flowing. Thereafter, by using an oven or the like, a heat treatment is performed under a condition of 100° C.×5 hours or so to completely cure the applied film of the phosphor slurry. The film thicknesses of fluorescent films formed in this manner are as shown in Table 1 respectively.

LED modules are each constituted in a manner that 126 pieces of LED chips each having an emission peak wavelength of 400 nm and each having a full width at half maximum of an emission spectrum being 15 nm are used and these LED chips are surface-mounted on a substrate to be covered with a silicone resin. Further, as each of the globes, a dome-shaped globe made of polycarbonate having a light transmittance of 88% is used. The thickness of each of the globes is about 1 mm. The LED light bulbs obtained in this manner were each subjected to later-described property evaluation.

Comparative Examples 1 and 2

An LED light bulb was fabricated in the same manner as in Example 1 except that the film thickness of the fluorescent film was set to 55 μm (Comparative Example 1). Further, an LED light bulb was fabricated in the same manner as in Example 1 except that the film thickness of the fluorescent film was set to 990 μm (Comparative example 2). These LED light bulbs were each subjected to later-described property evaluation.

Comparative Example 3

An LED light bulb having a combination of blue light-emitting LED chips and a yellow phosphor (a YAG phosphor) applied thereto was prepared and was subjected to later-described property evaluation. The LED light bulb was constituted in a manner that a fluorescent film made of the yellow phosphor was applied immediately on the blue LED chips.

Next, the LED light bulbs in Examples 1 to 10 and Comparative examples 1 to 3 were each lit, and there were measured a luminous flux (lumen), brightness (lm/W), chromaticity (x/y, u/v), a color rendering index (Ra), a correlated color temperature (Tc), a dominant wavelength (Dominant), a peak wavelength (nm), a full width at half maximum (FWHM), and so on of light emitted from each of the LED light bulbs. Further, from each of these measurement results, there was calculated an ultraviolet light leakage amount (a value (unit: mW/nm/lm) obtained by dividing an ultraviolet to violet light emission peak value in a range of not less than 370 nm nor more than 415 nm (unit: mW/nm) by a luminous flux (unit: lm)). These measurement evaluation results are shown in Table 1.

The above-described properties were evaluated by using a light quantity measuring apparatus provided with a 20-inch integrating sphere manufactured by Labsphere, Inc. This apparatus performs calibration by a spectral radiant intensity standard lamp, and thus highly accurate measurement is possible, unlike a method of using a conventional detector with a luminous-efficiency correction filter. The spectral radiant intensity standard lamp used for calibration is calibrated according to a guideline proposed by IGSNA: Illuminating Engineering Society, and calibration data is traceable in NIST (National Institute of Standards and Technology) standard. As for an object to be measured, by using an absorption correction lamp, correction with the standard lamp was performed on a measuring jig and a sample.

The actual measurement was conducted in a manner that at an ambient temperature Ta=25° C., the LED light bulb was fixed in the 20-inch integrating sphere with a bayonet cap placed down. The measurement sample was subjected to aging for 30 minutes or longer beforehand to stabilize the temperature of a lighting device. Thereafter, detachment and attachment in the measurement were performed swiftly and after several minutes (about three to five minutes or so) passed after lighting, the measurement was performed.

TABLE 1

| | Mixed Phosphor | | Film Thickness of Fluorescent Film [μm] | Brightness [lm/W] | Color Temperature [K] | Ra | Ultraviolet Light Leakage Amount [mW/nm/lm] |
|---|---|---|---|---|---|---|---|
| | Combination* | Mixing Ratio [mass %] | | | | | |
| Example 1 | B phosphor | 17.6 | 580 | 50 | 2700 | 92 | 0.04 |
| | GY phosphor 1 | 4.1 | | | | | |
| | R phosphor 1 | 78.3 | | | | | |
| Example 2 | B phosphor | 53.6 | 550 | 77 | 5000 | 90.8 | 0.03 |
| | GY phosphor 1 | 4.4 | | | | | |
| | R phosphor 1 | 42.0 | | | | | |
| Example 3 | B phosphor | 29.0 | 570 | 48 | 2700 | 94.8 | 0.04 |
| | GY phosphor 1 | 4.0 | | | | | |
| | R phosphor 1 | 57.2 | | | | | |
| | DR phosphor | 9.8 | | | | | |

TABLE 1-continued

|  | Mixed Phosphor |  | Film Thickness of Fluorescent Film [μm] | Brightness [lm/W] | Color Temperature [K] | Ra | Ultraviolet Light Leakage Amount [mW/nm/lm] |
|---|---|---|---|---|---|---|---|
|  | Combination* | Mixing Ratio [mass %] |  |  |  |  |  |
| Example 4 | B phosphor | 58 | 95 | 49 | 5000 | 93.1 | 0.09 |
|  | GY phosphor 1 | 2.6 |  |  |  |  |  |
|  | R phosphor 1 | 34.4 |  |  |  |  |  |
|  | DR phosphor | 5 |  |  |  |  |  |
| Example 5 | B phosphor | 26 | 510 | 51 | 2800 | 95.7 | 0.05 |
|  | BG phosphor | 0.5 |  |  |  |  |  |
|  | GY phosphor 1 | 3.7 |  |  |  |  |  |
|  | R phosphor 1 | 64.5 |  |  |  |  |  |
|  | DR phosphor | 5.3 |  |  |  |  |  |
| Example 6 | B phosphor | 53.9 | 545 | 71 | 5000 | 94 | 0.03 |
|  | BG phosphor | 0.5 |  |  |  |  |  |
|  | GY phosphor 1 | 2.5 |  |  |  |  |  |
|  | R phosphor 1 | 40.3 |  |  |  |  |  |
|  | DR phosphor | 2.8 |  |  |  |  |  |
| Example 7 | B phosphor | 16.8 | 350 | 44 | 2800 | 88 | 0.07 |
|  | GY phosphor 1 | 3.9 |  |  |  |  |  |
|  | R phosphor 2 | 79.9 |  |  |  |  |  |
| Example 8 | B phosphor | 15.5 | 645 | 40 | 2800 | 90 | 0.03 |
|  | GY phosphor 2 | 15.8 |  |  |  |  |  |
|  | R phosphor 1 | 68.7 |  |  |  |  |  |
| Example 9 | B phosphor | 24.8 | 620 | 40 | 2700 | 92 | 0.02 |
|  | BG phosphor | 0.5 |  |  |  |  |  |
|  | GY phosphor 1 | 3.5 |  |  |  |  |  |
|  | R phosphor 2 | 66.2 |  |  |  |  |  |
|  | DR phosphor | 5.0 |  |  |  |  |  |
| Example 10 | B phosphor | 18.8 | 540 | 54 | 3000 | 86 | 0.03 |
|  | GY phosphor 1 | 4.4 |  |  |  |  |  |
|  | R phosphor 1 | 76.8 |  |  |  |  |  |
| Comparative Example 1 | B phosphor | 17.6 | 55 | 22 | 2705 | 89 | 0.45 |
|  | GY phosphor 1 | 4.1 |  |  |  |  |  |
|  | R phosphor 1 | 78.3 |  |  |  |  |  |
| Comparative Example 2 | B phosphor | 17.6 | 990 | 24 | 2650 | 90 | 0.001 |
|  | GY phosphor 1 | 4.1 |  |  |  |  |  |
|  | R phosphor 1 | 78.3 |  |  |  |  |  |
| Comparative Example 3 | (Blue LED + YAG phosphor) |  |  | 31 | 8000 | 70 | — |

*GY phosphor 1 = Silicate phosphor, GY phosphor 2 = Aluminate phosphor, R phosphor 1 = Lanthanum oxysulfide phosphor, R phosphor 2 = Sialon phosphor As is clear from Table 1, it is found that in the LED light bulbs according to Examples 1 to 10, the ultraviolet light leakage amount is small and the practical brightness is obtained. Further, it is found that the LED light bulbs according to Examples 1 to 10 are each excellent in the color temperature and the average color rendering index Ra as compared with the LED light bulb in Comparative Example 3, and are each excellent in the practicality as an alternative to an incandescent light bulb. When dazzle and local over-brightness (glare) at the time of lighting of each of the LED light bulbs were evaluated visually, it was confirmed that in the LED light bulbs according to Examples 1 to 10, the glare was decreased as compared with the LED light bulb according to Comparative example 3.

Example 11

An LED light bulb was fabricated in the same manner as in Example 8 except that a silicone resin film containing no phosphor particles and having a film thickness of 160 μm was formed on the fluorescent film (having a film thickness=645 μm) in Example 8. When the properties of this LED light bulb were evaluated, the brightness was 40 lm/W, the color temperature was 2800 K, the average color rendering index Ra was 90, and the ultraviolet light leakage amount was 0.02 mW/nm/lm.

Example 12

An LED light bulb was fabricated in the same manner as in Comparative Example 1 except that as the resin film containing no phosphor particles, an epoxy resin film having a film thickness of 50 μm was formed on the fluorescent film (having a film thickness=55 μm) in Comparative example 1. Here, the epoxy resin film was formed by using an epoxy resin NLD-SL-2101 (product name) manufactured by SANYU REC Co., Ltd. described previously. When the properties of this LED light bulb were evaluated, the brightness was 22 lm/W, the color temperature was 2705 K, the average color rendering index Ra was 89, and the ultraviolet light leakage amount was 0.1 mW/nm/lm.

Incidentally, while certain embodiments of the present invention have been described, these embodiments have been presented by way of example only, and are not intended to limit the scope of the inventions. Indeed, the novel methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An LED light bulb, comprising:
an LED module including a substrate and an ultraviolet to violet light-emitting LED chip mounted on the substrate;
a base portion on which the LED module is disposed;
a globe attached to the base portion to cover the LED module;
a fluorescent film, provided on an inner surface of the globe separately from the LED chip, emitting white light by absorbing ultraviolet to violet light emitted from the LED chip;
a lighting circuit, provided in the base portion, lighting the LED chip; and
a bayonet cap electrically connected to the lighting circuit,
wherein the fluorescent film is made of a mixture of phosphor articles having a mean particle diameter of from 3 to 50 μm and a silicone resin as a binder, and has a film thickness in a range of from 80 to 800 μm,
wherein an amount of ultraviolet light which leaks from the globe is 0.1 mW/nm/lm or less, and
wherein a brightness of the LED light bulb is 35 lm/W or more.

2. The LED light bulb according to claim 1,
wherein the fluorescent film has the film thickness in a range of not less than 150 μm nor more than 600 μm.

3. The LED light bulb according to claim 1,
wherein the fluorescent film contains a blue phosphor, a green to yellow phosphor, and a red phosphor.

4. The LED light bulb according to claim 3,
wherein the blue phosphor includes a europium-activated alkaline earth chlorophosphate phosphor having a composition represented by a general formula:

$(Sr_{1-x-y-z}Ba_xCa_yEu_z)_5(PO_4)_3Cl$ where, a, x, y, and z are numbers satisfying $0 \leq x < 0.5$, $0 \leq y < 0.1$, and $0.005 \leq z < 0.1$),
wherein the green to yellow phosphor includes at least one selected from a europium and manganese-activated alkaline earth aluminate phosphor having a composition represented by a general formula:

$(Ba_{1-x-y-z}Sr_xCa_yEu_z)(Mg_{1-u}Mn_u)Al_{10}O_{17}$ where, x, y, z, and u are numbers satisfying $0 \leq x < 0.2$, $0 \leq y < 0.1$, $0.005 < z < 0.5$, and $0.1 \leq u \leq 0.5$;
a europium and manganese-activated alkaline earth silicate phosphor having a composition represented by a general formula:

$(Sr_{1-x-y-z-u}Ba_xMg_yEu_zMn_u)_2SiO_4$ where, x, y, z, and u are numbers satisfying $0.1 \leq x \leq 0.35$, $0.025 \leq y \leq 0.105$, $0.025 \leq z \leq 0.25$, and $0.0005 \leq u \leq 0.02$;
a europium-activated sialon phosphor having a composition represented by a general formula:

$(Si,Al)_6(O,N)_8:Eu_x$ where, x is a number satisfying $0 \leq x \leq 0.3$; and
a europium-activated sialon phosphor having a composition represented by a general formula:

$(Sr_{1-x}Eu_x)_\alpha Si_\beta Al_\gamma O_\delta N_\omega$ where, x, α, β, γ, δ, and ω are numbers satisfying $0 \leq x \leq 1$, $0 \leq \alpha \leq 3$, $12 \leq \beta \leq 14$, $2 \leq \gamma \leq 3.5$, $1 \leq \delta \leq 3$, and $20 \leq \omega \leq 22$, and
wherein the red phosphor includes at least one selected from a europium-activated lanthanum oxysulfide phosphor having a composition represented by a general formula:

$(La_{1-x-y}Eu_xM_y)_2O_2S$ where, M is at least one element selected from Sm, Ga, Sb, and Sn, and x and y are numbers satisfying $0.08 \leq x < 0.16$ and $0.000001 \leq y < 0.003$;
a europium-activated CASH phosphor having a composition represented by a general formula:

$(Ca_{1-x-y}Sr_xEu_y)SiAlN_3$ where, x and y are numbers satisfying and $0 \leq x < 0.4$ and $0 < y < 0.5$; and
a europium-activated sialon phosphor having a composition represented by a general formula:

$(Sr_{1-x}Eu_x)_\alpha Si_\beta Al_\gamma O_\delta N_\omega$ where, x, α, β, γ, δ, and ω are numbers satisfying $0 \leq x \leq 1$, $0 \leq \alpha \leq 3$, $5 < \beta < 9$, $1 \leq \gamma \leq 5$, $0.5 \leq \delta \leq 2$, and $5 \leq \omega \leq 15$.

5. The LED light bulb according to claim 3,
wherein the fluorescent film contains, in a mass proportion, the blue phosphor in a range of not less than 10% nor more than 60%, the green to yellow phosphor in a range of not less than 1% nor more than 30% and the red phosphor in a range of not less than 30% nor more than 90%, and a total amount of the blue phosphor, the green to yellow phosphor and the red phosphor is 100%.

6. The LED light bulb according to claim 3,
wherein the fluorescent film further contains at least one phosphor selected from a blue-green phosphor and a deep red phosphor.

7. The LED light bulb according to claim 6,
wherein the blue-green phosphor includes a europium and manganese-activated alkaline earth silicate phosphor having a composition represented by a general formula:

$(Ba_{1-x-y-z-u}Sr_xMg_yEu_zMn_u)_2SiO_4$ where, x, y, z, and u are numbers satisfying $0.1 \leq x \leq 0.35$, $0.025 \leq y \leq 0.105$, $0.025 \leq z \leq 0.25$, and $0.0005 \leq u \leq 0.02$, and
wherein the deep red phosphor includes a manganese-activated magnesium fluorogermanate phosphor having a composition represented by a general formula:

$\alpha MgO \cdot \beta MgF_2 \cdot (Ge_{1-x}Mn_x)O_2$ where, α, β, and x are numbers satisfying $3.0 \leq \alpha \leq 4.0$, $0.4 \leq \beta \leq 0.6$, and $0.001 \leq x \leq 0.5$.

8. The LED light bulb according to claim 6,
wherein the fluorescent film contains, in a mass proportion, the blue phosphor in a range of not less than 10% nor more than 60%, the blue-green phosphor in a range of not more than 10%, the green to yellow phosphor in a range of not less than 1% nor more than 30%, the red phosphor in a range of not less than 30% nor more than 90% and the deep red phosphor in a range of not more than 35%, and a total amount of the blue phosphor, the blue-green phosphor, the green to yellow phosphor, the red phosphor and the deep red phosphor is 100%.

9. The LED light bulb according to claim 1,
wherein the globe is made of a translucent member having a light transmittance of 80% or more.

10. The LED light bulb according to claim 1,
wherein the ultraviolet to violet light emitted from the LED chip has an emission peak wavelength in a range of not less than 370 nm nor more than 410 nm, and has a full width at half maximum of an emission spectrum in a range of not less than 10 nm nor more than 15 nm.

11. The LED light bulb according to claim 1,
wherein the white light emitted from the fluorescent film has a correlated color temperature of 6500 K or less, and has an average color rendering index (Ra) of 85 or more.

12. The LED light bulb according to claim 1, wherein the LED module includes a plurality of the LED chips surface-mounted on the substrate and a transparent resin layer provided on the substrate to cover the plurality of LED chips.

13. The LED light bulb according to claim 1, wherein the globe has a dome shape or an eggplant shape.

* * * * *